United States Patent
Tang et al.

(10) Patent No.: US 10,949,274 B2
(45) Date of Patent: Mar. 16, 2021

(54) INTER-CORE COMMUNICATION METHOD, PROCESSOR AND MULTI-PROCESSOR COMMUNICATION SYSTEM

(71) Applicant: SZ DJI TECHNOLOGY CO., LTD., Shenzhen (CN)

(72) Inventors: Shangchang Tang, Shenzhen (CN); Huafei Qi, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/736,080

(22) Filed: Jan. 7, 2020

(65) Prior Publication Data

US 2020/0142762 A1    May 7, 2020

Related U.S. Application Data

(63) Continuation of application No. PCT/CN2017/116168, filed on Dec. 14, 2017.

(51) Int. Cl.
- *G06F 9/44* (2018.01)
- *G06F 9/54* (2006.01)
- *G06F 13/42* (2006.01)

(52) U.S. Cl.
CPC .......... *G06F 9/546* (2013.01); *G06F 13/4282* (2013.01); *G06F 2213/0026* (2013.01); *G06F 2213/0042* (2013.01)

(58) Field of Classification Search
CPC .................................................. G06F 9/546
USPC ........................................................ 719/313
See application file for complete search history.

(56) References Cited

U.S. PATENT DOCUMENTS

| | | | |
|---|---|---|---|
| 7,302,548 B1 | 11/2007 | Mitten et al. | |
| 2018/0293698 A1* | 10/2018 | Venkatesh | G06T 1/60 |
| 2018/0301123 A1* | 10/2018 | Appu | G09G 5/393 |

FOREIGN PATENT DOCUMENTS

| | | |
|---|---|---|
| CN | 101304322 A | 11/2008 |
| CN | 103176941 A | 6/2013 |
| CN | 104572315 A | 4/2015 |

OTHER PUBLICATIONS

The World Intellectual Property Organization (WIPO) International Search Report for PCT/CN2017/116168 dated Jul. 31, 2018 5 pages.

* cited by examiner

*Primary Examiner* — Timothy A Mudrick
(74) *Attorney, Agent, or Firm* — Anova Law Group, PLLC (57) ABSTRACT

An inter-core communication method includes a first inter-core processing circuit of a first processor receiving an inter-core message sent by a first core of the first processor, determining that a target core indicated by the inter-core message is a second core of a second processor, and sending the inter-core message to a first cross-processor communication agent circuit of the first processor, the first cross-processor communication agent circuit sending the inter-core message to a second cross-processor communication agent circuit of the second processor, the second cross-processor communication agent circuit sending the inter-core message to a second inter-core processing circuit of the second processor, and the second inter-core processing circuit sending the inter-core message to the second core.

18 Claims, 7 Drawing Sheets

INTER-CORE COMMUNICATION METHOD, PROCESSOR AND MULTI-PROCESSOR COMMUNICATION SYSTEM

CROSS-REFERENCE TO RELATED APPLICATION

This application is a continuation of International Application No. PCT/CN2017/116168, filed on Dec. 14, 2017, the entire content of which is incorporated herein by reference.

TECHNICAL FIELD

The present disclosure relates to the field of computer and, more particularly, to an inter-core communication method, a processor, and a multi-processor communication system.

BACKGROUND

As applications of intelligent technologies for unmanned aerial vehicles (UAVs) become more and more common, requirements on computing power of unmanned aerial vehicle (UAV) platforms are becoming higher and higher, thereby greatly promoting a demand for various types of processors for the UAV platforms. Currently, multiple cores in a same processor can communicate to each other.

With the increasing demand for various types of processors for the UAV platforms, a demand for a diversity of communication forms for inter-core communication is also increasing.

SUMMARY

In accordance with the disclosure, there is provided an inter-core communication method including a first inter-core processing circuit of a first processor receiving an inter-core message sent by a first core of the first processor, determining that a target core indicated by the inter-core message is a second core of a second processor, and sending the inter-core message to a first cross-processor communication agent circuit of the first processor, the first cross-processor communication agent circuit sending the inter-core message to a second cross-processor communication agent circuit of the second processor, the second cross-processor communication agent circuit sending the inter-core message to a second inter-core processing circuit of the second processor, and the second inter-core processing circuit sending the inter-core message to the second core.

Also in accordance with the disclosure, there is provided a multi-processor communication system including a first processor and a second processor. The first processor includes a first inter-core processing circuit and a first cross-processor communication agent circuit. The second processor includes a second inter-core processing circuit and a second cross-processor communication agent circuit. The first inter-core processing circuit is configured to receive an inter-core message sent by a first core of the first processor, determine that a target core indicated by the inter-core message is a second core of the second processor, and send the inter-core message to the first cross-processor communication agent circuit. The first cross-processor communication agent circuit is configured to send the inter-core message to the second cross-processor communication agent circuit. The second cross-processor communication agent circuit is configured to send the inter-core message to the second inter-core processing circuit. The second inter-core processing circuit is configured to send the inter-core message to the second core.

BRIEF DESCRIPTION OF THE DRAWINGS

In order to provide a clearer illustration of technical solutions of disclosed embodiments, the drawings used in the description of the disclosed embodiments are briefly described below. It will be appreciated that the disclosed drawings are merely examples. Other drawings can be conceived by those having ordinary skills in the art on the basis of the disclosed drawings without inventive efforts.

DETAILED DESCRIPTION OF THE EMBODIMENTS

In order to provide a clearer illustration of purposes, technical solutions, and advantages of disclosed embodiments, example embodiments will be described with reference to the accompanying drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

It is intended that the embodiments disclosed herein are merely exemplary. Changes, modifications, alterations, and variations of the above-described embodiments may be made by those skilled in the art without departing from the scope of the disclosure. The scope of the invention can be defined by the following claims or equivalent thereof.

Figure 1:
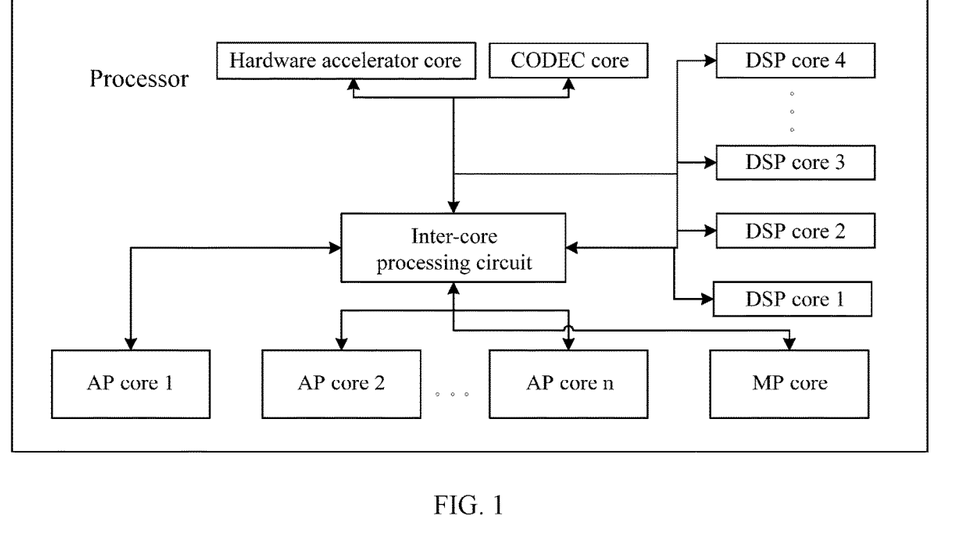
FIG. 1 is a schematic architecture diagram of a processor consistent with embodiments of the disclosure.
Figure 2:
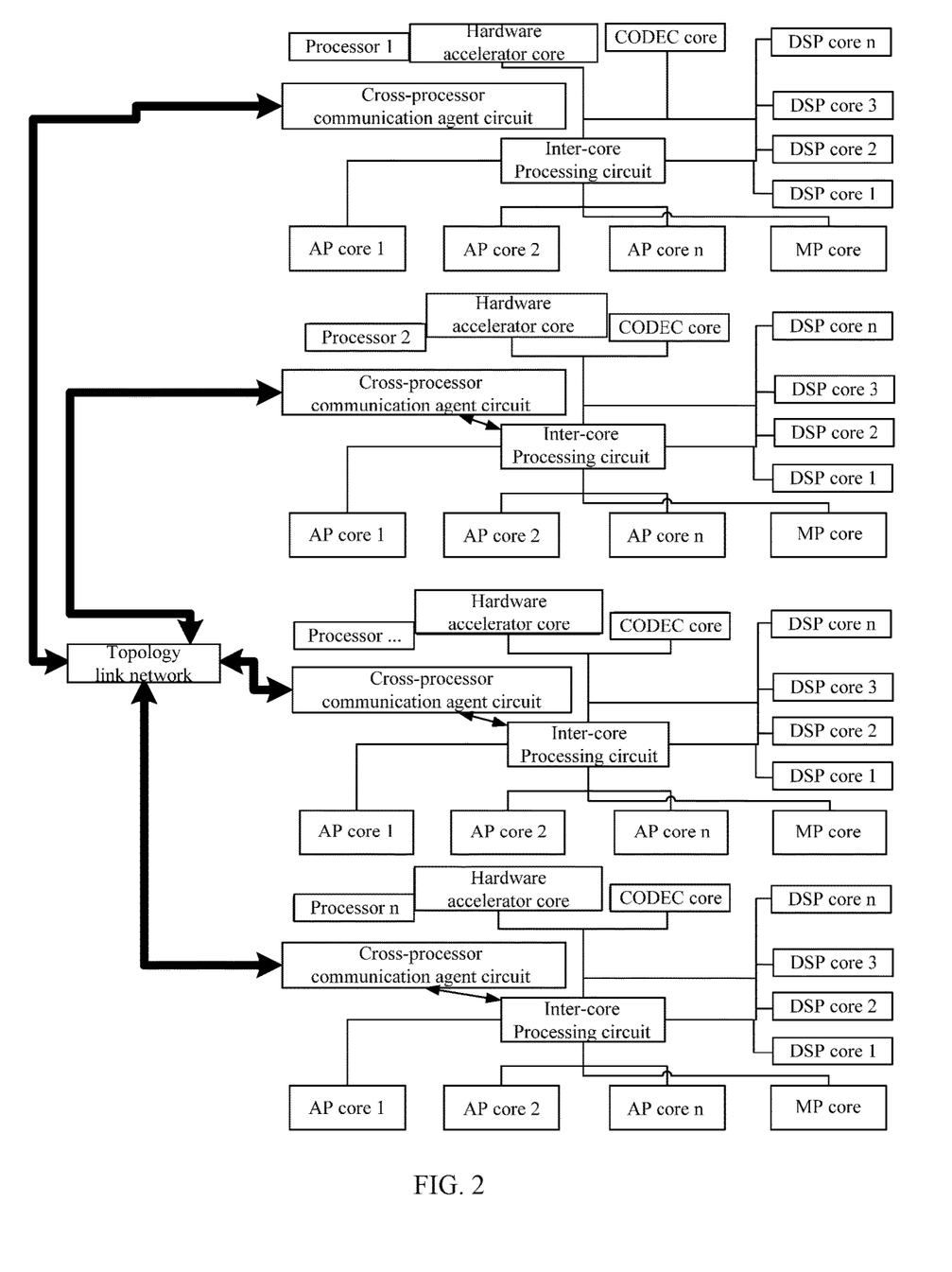
FIG. 2 is a schematic architecture diagram of a multi-processor communication system consistent with embodiments of the disclosure.

FIG. 1 is a schematic architecture diagram of an example processor consistent with the disclosure. FIG. 2 is a schematic architecture diagram of an example multi-processor communication system consistent with the disclosure. As shown in FIG. 1, the processor can include a multi-core processor. The multi-core processor can include a plurality of cores (also referred to as inner cores). As shown in FIGS. 1 and 2, the plurality of cores of the multi-core processor can include hardware accelerator cores, digital signal processing (DSP) cores, advanced reduced instruction computer machines processor (AP) cores, Cortex-M processor (MP) cores, coder/decoder (CODEC) cores, any combination thereof.

For example, in the unmanned aerial vehicle (UAV) field, the MP core can be configured to perform algorithms related to flight control, the AP core can be configured to perform common system tasks, the DSP core can be configured to perform high-performance algorithms, for example, image filtering and enhancement algorithms, various types of visual algorithms, and various types of pattern recognition algorithms.

As shown in FIGS. 1 and 2, the multi-core processor includes an inter-core processing circuit configured to perform an intra-processor inter-core communication. When any two cores in different processors need to exchange data, a cross-processor communication needs to be performed. As shown in FIG. 2, each multi-core processor can include a cross-processor communication agent circuit (inter-processor communication agent circuit) communicating with the inter-core processing circuit. Therefore, a cross-processor inter-core communication can be achieved. The cross-processor inter-core communication refers to a communication between different cores in different processors, and can also be referred to as an "inter-processor inter-core communication."

Figure 3:
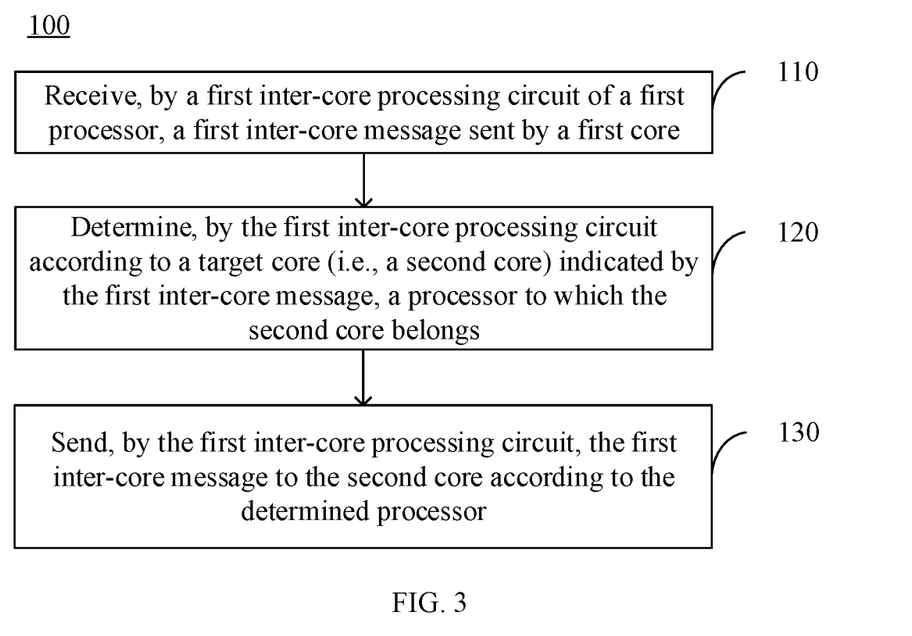
FIG. 3 is a schematic flow chart of an inter-core communication method consistent with embodiments of the disclosure.
Figure 4:
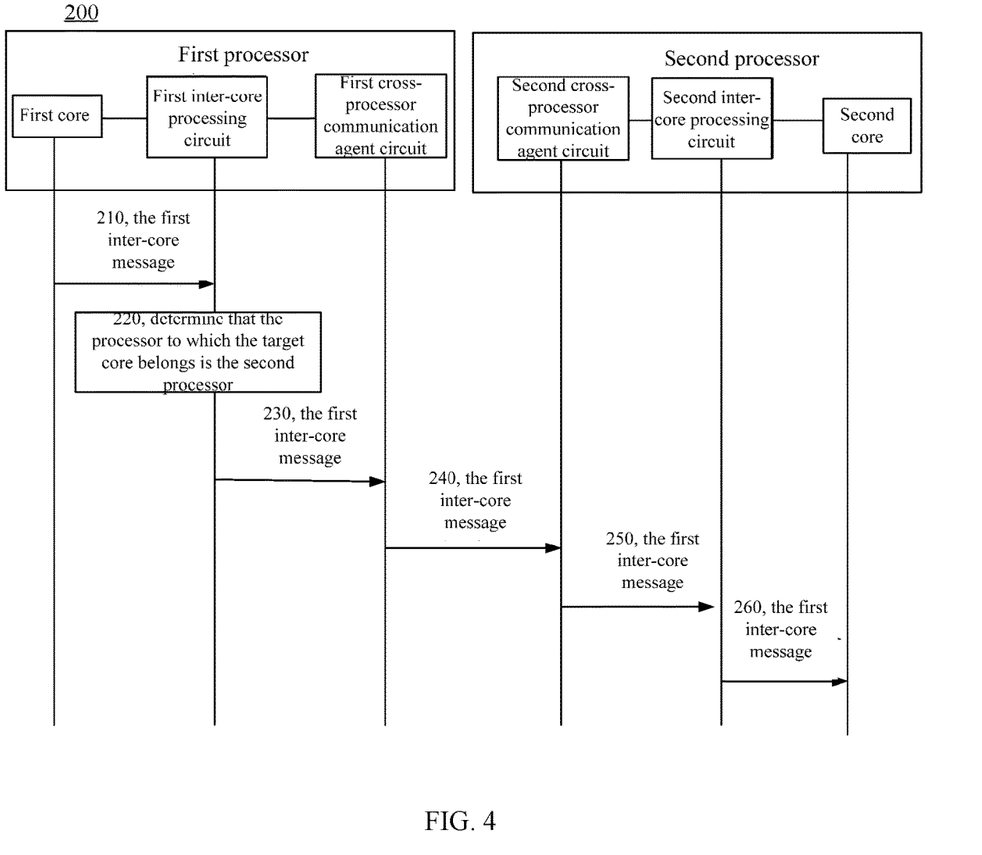
FIG. 4 is a schematic flow chart of another inter-core communication method consistent with embodiments of the disclosure.

FIG. 3 is a schematic flow chart of an example inter-core communication method 100 consistent with the disclosure. FIG. 4 is a schematic flow chart of another example inter-core communication method 200 consistent with the disclosure. Implementation of an inter-core communication in a multi-processor system will be described in detail in connection with FIGS. 3 and 4.

It can be appreciated that the method 100 can include some or all of the processes described below. As shown in FIG. 3, at 110, a first inter-core processing circuit of a first processor receives a first inter-core message sent by a first core of the first processor. For example, when the first core of the first processor needs to communicate with another core, it can send the first inter-core message to the first inter-core processing circuit, such that the first inter-core processing circuit can obtain the first inter-core message. In some embodiments, the first inter-core processing circuit may be arranged at the first core and functions of the first inter-core processing circuit can be implemented by the first core. In some other embodiments, the first inter-core processing circuit may also be arranged at another core of the first processor, which is not limited herein.

At 120, according to a target core (i.e., a second core) indicated by the first inter-core message, the first inter-core processing circuit determines a processor to which the second core belongs. For example, when the first core of the first processor needs to send the first inter-core message to the target core, the target core can be indicated by the first inter-core message. Therefore, after receiving the first inter-core message, the first inter-core processing circuit may search routing table entries according to the indicated target core (i.e., the second core), and determine the processor to which the second core belongs.

At 130, the first inter-core processing circuit sends the first inter-core message to the second core according to the determined processor. In some embodiments, if the processor to which the target core belongs is the first processor, the first inter-core processing circuit can send the first inter-core message to the second core using an intra-processor inter-core communication.

In some other embodiments, if the processor to which the target core belongs is a second processor (different from the first processor), the first inter-core processing circuit can send the first inter-core message to a first cross-processor communication agent circuit of the first processor. The first cross-processor communication agent circuit can send the first inter-core message to a second cross-processor communication agent circuit of the second processor, and the second cross-processor communication agent circuit can send the first inter-core message to the second core. That is, in some embodiments, in addition to the inter-core processing circuit, each processor can further include the cross-processor communication agent circuit configured to perform a cross-processor communication.

For example, processor 1 can include inter-core processing circuit 1 (a hardware circuit for the inter-core communication), and each core in processor 1 can directly access inter-core processing circuit 1. When a core (e.g., core_A) in processor 1 needs to communicate with another core (e.g., core_B), a message can be sent directly to inter-core processing circuit 1. When determining that the target core of the message is core_B of processor 1, inter-core processing circuit 1 can automatically send an interrupt to core_B to notify core_B that a communication service request has been received from core_A. Correspondingly, core_B can use a similar mechanism to perform a communication service request from core_B to core_A. When determining that the target core of the message is core_B of processor 2, inter-core processing circuit 1 can forward the message to cross-processor communication agent circuit 1 in processor 1. Cross-processor communication agent circuit 1 can forward the message to the cross-processor inter-core communication circuit 2 of processor 2 to which core_B is belong. Cross-processor communication agent circuit 2 can forward the message to inter-core processing circuit 2 of processor 2, and inter-core processing circuit 2 may send the message to core_B.

For better understanding, the implementation of the cross-processor communication will be described in detail in connection with FIG. 4. It can be appreciated that the method 200 can include some or all of the processes described below.

As shown in FIG. 4, at 210, the first inter-core processing circuit of the first processor receives the first inter-core message sent by the first core of the first processor.

At 220, according to the target core (i.e., the second core) indicated by the first inter-core message, the first inter-core processing circuit determines that the processor to which the second core belongs is the second processor. In some embodiments, the first inter-core processing circuit may search the routing table entries according to the indicated target core (i.e., the second core), and determine the processor to which the second core belongs being the second processor.

At 230, the first inter-core processing circuit sends the first inter-core message to the first cross-processor communication agent circuit of the first processor. In some embodiments, the first inter-core processing circuit may be arranged at the first core and the functions of the first inter-core processing circuit can be implemented by the first core. In some other embodiments, the first inter-core processing circuit may also be arranged at another core, which is not limited herein.

At 240, the first cross-processor communication agent circuit sends the first inter-core message to a second cross-processor communication agent circuit of the second processor. In some embodiments, before the first cross-processor communication agent circuit sends the first inter-core message to the second cross-processor communication agent circuit of the second processor, the first cross-processor communication agent circuit can determine whether a session has been established between the first processor and the second processor. If the session has not been established, the session between the first processor and the second processor can be created.

For example, after receiving the communication service request, the first cross-processor communication agent circuit can check whether a communication agent session with the counterpart processor (i.e., the target processor) that needs to communicate has been created locally. If the session has been created, the session can be used directly to send the communication service request. If not, a session with the target processor that needs to communicate can be first established, and then this session can be used to send the communication service request.

In some embodiments, the first cross-processor communication agent circuit can use, for example, a Peripheral Component Interconnect Express (PCIE) bus, a rapid input output (IO) bus, a universal serial bus (USB), or a network, to send the first inter-core message to the second cross-processor communication agent circuit. In some embodiments, when using the PCIE for cross-processor communication, one processor on the PCIE bus may be in a Root Complex (RC) state, and the other processors may be in an End Point (EP) state.

In some embodiments, the second inter-core processing circuit may be arranged at the second core and functions of second inter-core processing circuit can be implemented by the second core. In some other embodiments, the second inter-core processing circuit may also be arranged at another core, which is not limited herein.

At 250, the second cross-processor communication agent circuit sends the first inter-core message to the second inter-core processing circuit of the second processor. In some embodiments, the second inter-core processing circuit may be arranged at the second core and the functions of second inter-core processing circuit can be implemented by the second core. In some other embodiments, the second inter-core processing circuit may also be arranged at another core, which is not limited herein.

At 260, the second inter-core processing circuit sends the first inter-core message to the second core. In some embodiments, the first inter-core message can include a processing mode of first data. For example, the first inter-core message can include the processing mode of the data to be processed, and thus the target core can process the data to be processed according to the processing mode.

In some embodiments, the first inter-core message can directly include the data to be processed, such that the target core can obtain the data to be processed from the first inter-core message and process the obtained data. In some embodiments, the first inter-core message can include an address of the first data in a first storage space, and the first cross-processor communication agent circuit can write the first data into the first storage space, such that the second core can read the first data from the first storage space. Correspondingly, the second cross-processor communication agent circuit can map the second core to the address of the first data in the first storage space, such that the second core can access the first data.

For example, during an entire message forwarding process, the data may not forwarded. The data can be stored in a Double Data Rate Synchronous Dynamic Random Access Memory (DDR-SDRAM, or simply DDR) of a source processor (e.g., the first processor). However, an address of the DDR can be sent to the second cross-processor communication agent circuit in the target processor (the second processor), and the second cross-processor communication agent circuit can perform an address mapping of the DDR space. As such, the target processor can access the mapped DDR space of the source processor in the same way as accessing the local DDR address space of the target processor.

In some embodiments, the first cross-processor communication agent circuit can send an interrupt message to the second processor to trigger an interrupt of the second core. The second cross-processor communication agent circuit can receive the interrupt message from the first processor and trigger the interrupt of the second core. In some embodiments, the first processor can be an EP-side processor, and the second processor can be an RC-side processor.

For example, if the target processor (i.e., the second processor) is an RC-side processor on the PCIE, after the cross-processor communication agent circuit of the EP-side processor forwards the message to a target end, message signaled interrupts (MSI) can be used to notify the RC-side processor to generate the interrupt. When processing the MSI interrupt, the RC-side processor can determine that an agent request message service has be completed. Based on content of the message, whether to transmit the message to the inter-core processing circuit of the target processor can be determined, and the inter-core processing circuit can send the message to the target core.

In some embodiments, the first cross-processor communication agent circuit can update state information of the inter-core message between the first processor and the second processor in a second storage space. The second cross-processor communication agent circuit can read the state information of the message between the first processor and the second processor in the second storage space. The second cross-processor communication agent circuit can determine that whether there is an updated first inter-core message according to the state information of the second storage space. In some embodiments, the first processor can be the RC-side processor, and the second processor can be the EP-side processor.

For example, if the target processor (e.g., the second processor) is the EP-side processor on PCIE, after the cross-processor communication agent circuit of the RC-side processor forwards a message to the target processor, a data area of the RC-side processor that is shared by the RC-side processor and EP-side processor can be updated. The EP-side processor can periodically query whether there is a message from the RC-side processor. If a new message has arrived, the new message can be processed by the EP-side processor. The cross-processor communication agent circuit on the EP side can determine to forward the message to the inter-core processing circuit of the target processor according to the content of the message, and the inter-core processing circuit can send the message to the target core.

Implementation of the transmission of the first inter-core message from the first core of the first processor to the second core of the second processor has been described above. Implementation of the transmission of a second inter-core message from the second core of the second processor to the first core of the first processor will be described below. The second inter-core message may include a response message of the first inter-core message, or a message unrelated to the first inter-core message.

In some embodiments, the second inter-core message can be sent by the second inter-core processing circuit to the second cross-processor communication agent circuit. The second cross-processor communication agent circuit can send the second inter-core message to the first cross-processor communication agent circuit, and the first cross-processor communication agent circuit can send the second inter-core message to the first core. The first cross-processor communication agent circuit can obtain the second inter-core message from the second core and forwarded by the second cross-processor communication agent circuit. The first cross-processor communication agent circuit can send the second inter-core message to the first inter-core processing circuit, and the first inter-core processing circuit can send the second inter-core message to the first core.

In some embodiments, the second inter-core message can include a processing mode of second data. In some embodiments, the second inter-core message can further include the second data. In some embodiments, the second inter-core message can include an address of the second data in a third storage space. The first cross-processor communication agent circuit can map the first core to the address of the second data in the third storage space, such that the first core can access the second data.

In some embodiments, the first cross-processor communication agent circuit can receive an interrupt message from the second processor and trigger an interrupt of the first core. In some embodiments, the first processor can be the RC-side processor, and the second processor can be the EP-side processor.

In some embodiments, the first cross-processor communication agent circuit can read the state information of the inner-core message between the first processor and the second processor in the second storage space. The first cross-processor communication agent circuit can determine whether there is an updated second inter-core message according to the state information in the second storage space. In some embodiments, the first processor can be the EP-side processor, and the second processor can be the RC-side processor.

Consistent with the disclosure, when different cores need to communicate with each other, the communication service request can be directly submitted to the inter-core processing circuit. The inter-core processing circuit can determine the processor to which the target core of the inter-core message belongs. When determining that the target core belongs to the same processor, the inter-core processing circuit can submit the communication request to the target core. For example, the communication request can be submitted to a hardware circuit, and a driver of the circuit can be configured to perform the communication between different cores of the same processor. When the inter-core processing circuit determines that the target core belongs to another processor, the inter-core processing circuit can submit the communication request to the cross-processor communication agent circuit. The circuit can forward the communication request to the cross-processor communication agent circuit of the target processor, and then the cross-processor communication agent circuit of the target processor can forward the communication request to the core of the target processor that needs to be communicated with. When different cores perform the inter-core communication, it does not matter if they are cores of the same processor or different processors. Therefore, an inter-core transparent service can be provided for services running on each core. That is, when an upper-layer service software needs to perform the inter-core communication, it does not need to be concerned about whether the communication is performed on different cores of the same processor or different processors, thereby reducing a complexity of the upper-layer service software. As such, the diversity of communication forms for the inter-core communication can be achieved without increasing the complexity of the upper-layer service software.

Figure 5:
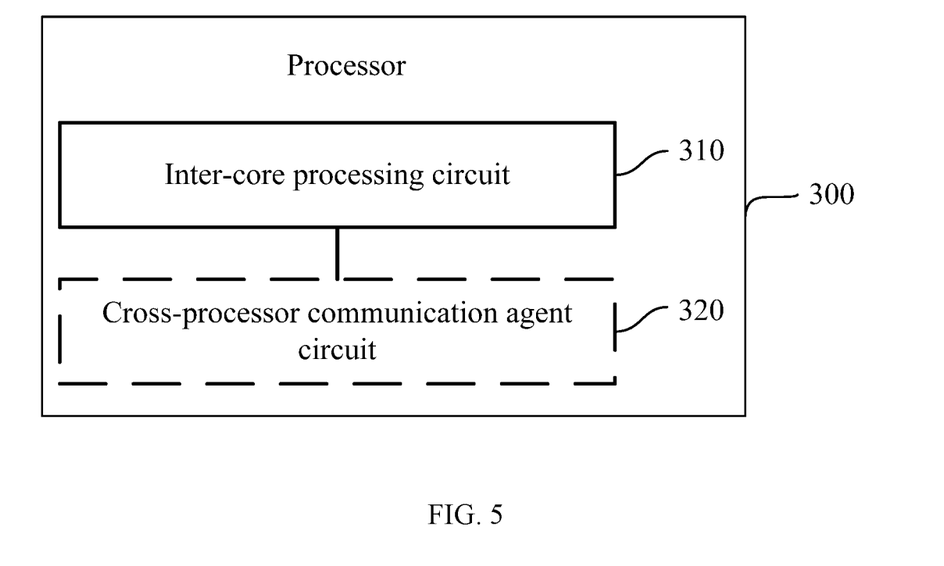
FIG. 5 is a schematic block diagram of a processor consistent with embodiments of the disclosure.

FIG. 5 is a schematic block diagram of an example processor 300 consistent with the disclosure. As shown in FIG. 5, the processor 300 includes an inter-core processing circuit 310. The inter-core processing circuit 310 can be configured to receive the first inter-core message sent by the first core of the processor 300 (the first processor), determine the processor to which the second core belongs according to the target core (i.e., the second core) indicated by the first inter-core message, and send the first inter-core message to the second core according to the determined processor.

In some embodiments, the inter-core processing circuit 310 can be further configured to search the routing table entries according to the target core (i.e., the second core) indicated by the first inter-core message and determine the processor to which the second core belongs. In some embodiments, the inter-core processing circuit 310 can be further configured to, in response to that the processor to which the target core belongs is the processor 300, send the first inter-core message to the second core using the intra-processor inter-core communication.

In some embodiments, the processor 300 can further includes a cross-processor communication agent circuit 320. The inter-core processing circuit 310 can be further configured to, in response to that the processor to which the target core belongs is the second processor, send the first inter-core message to the cross-processor communication agent circuit 320. The cross-processor communication agent circuit 320 can be configured to send the first inter-core message to the second cross-processor communication agent circuit of the second processor, such that the second cross-processor communication agent circuit can send the first inter-core message to the second core.

In some embodiments, the cross-processor communication agent circuit 320 can be further configured to determine whether the session has been established between the first processor and the second processor, and in response to no session being established, create the session between the first processor and the second processor. In some embodiments, the cross-processor communication agent circuit 320 can be further configured to use, for example, a PCIE bus, a rapid IO bus, a USB, or a network, to send the first inter-core message to the second cross-processor communication agent circuit.

In some embodiments, the first inter-core message can include the processing mode of the first data. In some embodiments, the first inter-core message can include the first data. In some other embodiments, the first inter-core message can include the address of the first data in the first storage space. In some embodiments, the cross-processor communication agent circuit 320 can be further configured to write the first data into the first storage space, such that the second core can read the first data from the first storage space.

In some embodiments, the cross-processor communication agent circuit 320 can be further configured to send the interrupt message to the second processor to trigger the interrupt of the second core. In some embodiments, the cross-processor communication agent circuit 320 can be further configured to update the state information of the inter-core message between the first processor and the second processor in the second storage space.

In some embodiments, the cross-processor communication agent circuit 320 can be further configured to obtain the second inter-core message from the second core and forwarded by the second cross-processor communication agent circuit, and send the second inter-core message to the inter-core processing circuit 310. The inter-core processing circuit 310 can be further configured to send the second inter-core message to the first core.

In some embodiments, the cross-processor communication agent circuit 320 can be further configured to receive the interrupt message from the second processor and trigger the interrupt of the first core. In some embodiments, the cross-processor communication agent circuit 320 can be further configured to read the state information of the inner-core message between the first processor and the second processor in the second storage space, and determine whether there is the updated second inter-core message according to the state information in the second storage space.

In some embodiments, the second inter-core message can include the processing mode of second data. In some embodiments, the second inter-core message can further include the second data. In some other embodiments, the second inter-core message can include the address of the second data in the third storage space. The cross-processor communication agent circuit 320 can be further configured to map the first core to the address of the second data in the third storage space, such that the first core can access the second data.

In some embodiments, the processor 300 can be the RC-side processor and the second processor can be the EC-side processor. In some other embodiments, the processor 300 can be the EC-side processor and the second processor can be the RC-side processor. In some embodiments, the cross-processor communication agent circuit 320 can be arranged at the first core. In some embodiments, the inter-core processing circuit 310 can be arranged at the first core.

The processor 300 can perform the corresponding operations of the first processor in the inter-core communication method described above, and detailed description thereof is omitted herein.

Figure 6:
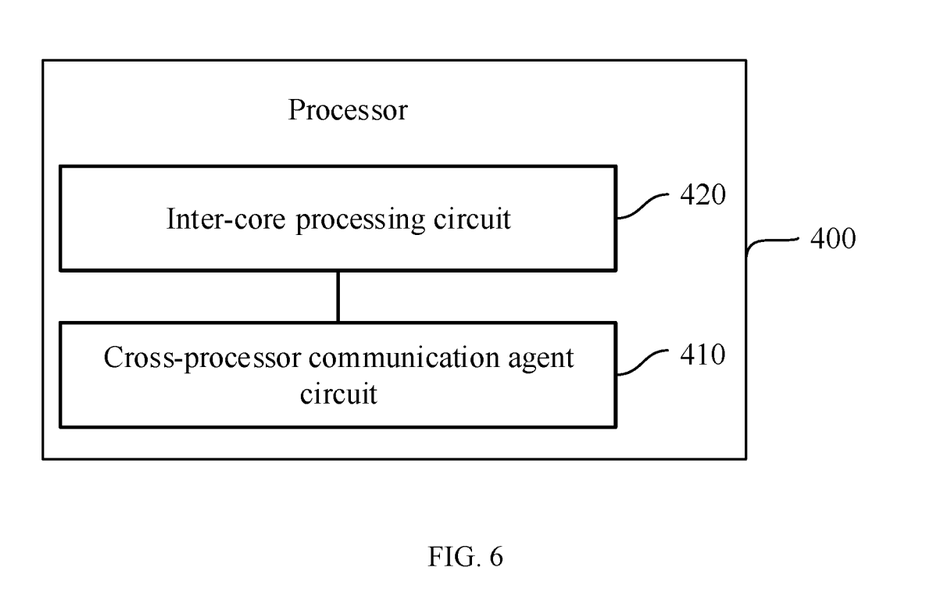
FIG. 6 is a schematic block diagram of another processor consistent with embodiments of the disclosure.

FIG. 6 is a schematic block diagram of an example processor 400 consistent with the disclosure. As shown in FIG. 6, the processor 400 includes a cross-processor communication agent circuit 410 and an inter-core processing circuit 420. The cross-processor communication agent circuit 410 can be configured to obtain the first inter-core message and send the first inter-core message to the inter-core processing module 420. The first inter-core message refers to the inter-core message from the first core and forwarded by the first cross-processor communication agent circuit of the first processor. The target core of the first inter-core message can be the second core in the second processor.

In some embodiments, the inter-core processing circuit 420 can be configured to send the first inter-core message to the second core. In some embodiments, the first inter-core message can be send to the cross-processor communication agent circuit 410 by the first cross-processor communication agent circuit using, for example, a PCIE bus, a rapid IO bus, a USB, or a network.

In some embodiments, the first inter-core message can include the processing mode of the first data. In some embodiments, the first inter-core message can include the first data. In some other embodiments, the first inter-core message can include the address of the first data in the first storage space. The cross-processor communication agent circuit 410 can be further configured to map the second core to the address of the first data in the first storage space, such that the second core can access the first data.

In some embodiments, the cross-processor communication agent circuit 410 can be further configured to receive the interrupt message from the first processor and trigger the interrupt of the second core. In some embodiments, the cross-processor communication agent circuit 410 can be further configured to read the state information of the inner-core message between the first processor and the second processor in the second storage space, and determine whether there is the updated first inter-core message according to the state information in the second storage space.

In some embodiments, the inter-core processing circuit 420 can be further configured to send the second inter-core message to the cross-processor communication agent circuit 410. In some embodiments, the cross-processor communication agent circuit 410 can be further configured to send the second inter-core message to the first cross-processor communication agent circuit, such that the first cross-processor communication agent circuit can send the second inter-core message to the first core.

In some embodiments, the second inter-core message can include the processing mode of second data. In some embodiments, the second inter-core message can further include the second data. In some other embodiments, the second inter-core message can include the address of the second data in the third storage space.

In some embodiments, the first processor can be the RC-side processor and the processor 400 can be the EC-side processor. In some other embodiments, the first processor can be the EC-side processor and the processor 400 can be the RC-side processor. In some embodiments, the cross-processor communication agent circuit 410 can be arranged at the second core. In some embodiments, the inter-core processing circuit 420 can be arranged at the second core.

The processor 400 can perform the corresponding operations of the second processor in the inter-core communication method described above, and detailed description thereof is omitted herein.

Figure 7:
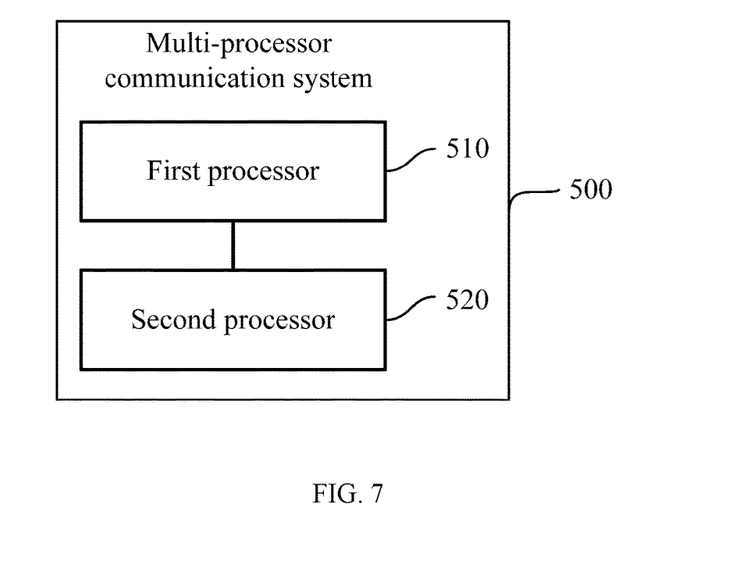
FIG. 7 is a schematic block diagram of a multi-processor communication system consistent with embodiments of the disclosure.

FIG. 7 is a schematic block diagram of an example multi-processor communication system 500 consistent with the disclosure. As shown in FIG. 7, the multi-processor communication system 500 include a first processor 510 and a second processor 520. The first processor 510 includes a first inter-core processing circuit 512 and a first cross-processor communication agent circuit 514. The second processor 520 includes a second inter-core processing circuit 522 and a second cross-processor communication agent circuit 524. The first inter-core processing circuit 512 can be configured to receive the first inter-core message sent by the first core of the first processor 510, determine that the processor to which the second core belongs is the second processor 520 according to the target core (i.e., the second core) indicated by the first inter-core message, and send the first inter-core message to the first cross-processor communication agent circuit 514.

The first cross-processor communication agent circuit 514 can be configured to send the first inter-core message to the second cross-processor communication agent circuit 524. The second cross-processor communication agent circuit 524 can be configured to send the first inter-core message to the second inter-core processing circuit 522. The second inter-core processing circuit 522 can be configured to send the first inter-core message to the second core. In some embodiments, the first inter-core processing circuit 512 can be further configured to search the routing table entries according to the target core (i.e., the second core) indicated by the first inter-core message and determine that the processor to which the second core belongs is the second processor 520.

In some embodiments, the first cross-processor communication agent circuit 514 can be further configured to determine whether the session has been established between the first processor 510 and the second processor 520, and in response to no session being established, create the session between the first processor 510 and the second processor 520. In some embodiments, the first inter-core message can be sent to the second cross-processor communication agent circuit 524 by the first cross-processor communication agent circuit 514 using, for example, a PCIE bus, a rapid IO bus, a USB, or a network.

In some embodiments, the first inter-core message can include the processing mode of the first data. In some embodiments, the first inter-core message can include the first data. In some other embodiments, the first inter-core message can include the address of the first data in the first storage space. The first cross-processor communication agent circuit 514 can be further configured to write the first data into the first storage space, such that the second core can read the first data from the first storage space. The second cross-processor communication agent circuit 524 can be further configured to map the second core to the address of the first data in the first storage space, such that the second core can access the first data.

In some embodiments, the first cross-processor communication agent circuit 514 can be further configured to send the interrupt message to the second processor 520 to trigger the interrupt of the second core. The second cross-processor communication agent circuit 524 can be further configured to receive the interrupt message from the first processor 510 and trigger the interrupt of the second core.

In some embodiments, the first cross-processor communication agent circuit 514 can be further configured to the state information of the first inter-core message between the first processor 510 and the second processor 520 in the second storage space. The second cross-processor communication agent circuit 524 can be further configured to read the state information of the inner-core message between the first processor and the second processor in the second storage space, and determine whether there is the updated first inter-core message according to the state information in the second storage space.

In some embodiments, the first processor 510 can be the RC-side processor and the second processor 520 can be the EC-side processor. In some other embodiments, the first processor 510 can be the EC-side processor and the second processor 520 can be the RC-side processor. In some embodiments, the first cross-processor communication agent circuit 514 can be arranged at the first core, and/or the second cross-processor communication agent circuit 524 can be arranged at the second core, and/or the first inter-core processing circuit 512 can be arranged at the first core, and/or the second inter-core processing circuit 522 can be arranged at the second core.

The system 500 can perform the corresponding processes of the inter-core communication method 200 described above, and detailed description thereof is omitted herein.

Figure 8:
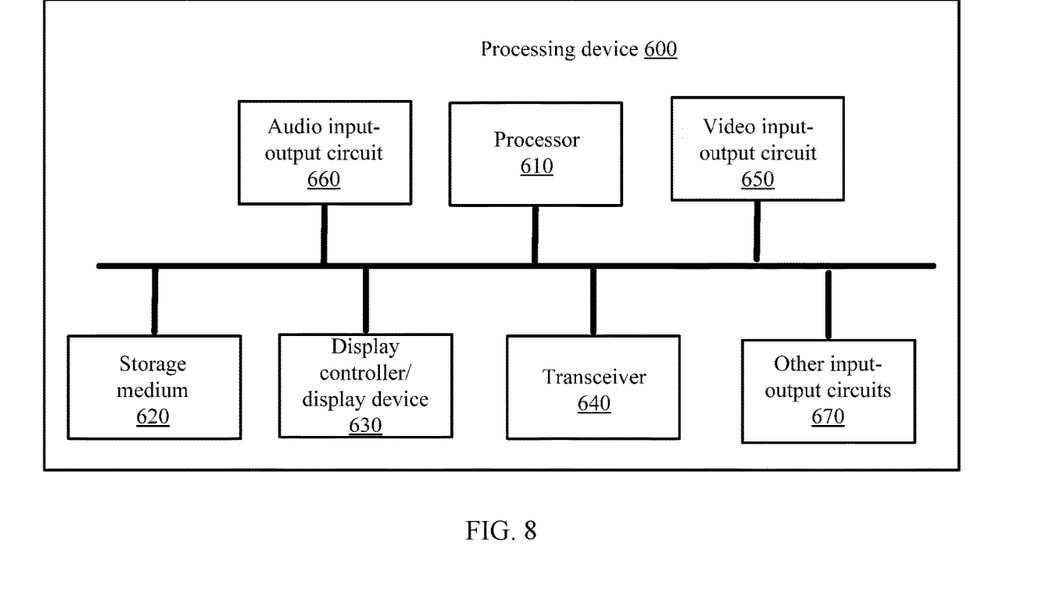
FIG. 8 is a schematic block diagram of a processing device consistent with embodiments of the disclosure.

FIG. 8 is a schematic block diagram of an example processing device 600 consistent with the disclosure. The processing device 600 may include a plurality of different components. The plurality of components can include integrated circuits (ICs) or parts of ICs, discrete electronic devices, other suitable circuit boards (e.g., motherboards or add-on boards), or components incorporated into a computer system.

As shown in FIG. 8, the processing device 600 includes a processor 610 and a storage medium 620 coupled to the processor 610. The processor 610 can communicate with the storage medium 620. The storage medium 620 can include a magnetic disk, an optical disk, a read only memory (ROM), a flash memory, or a phase change memory. The storage medium 620 can store instructions that can be executed by the processor, and/or may cache the data of the inter-core message and/or the state information of the inter-core message as described above.

In some embodiments, the processing device 600 further includes a display controller and/or display device 630, a transceiver 640, a video input-output circuit 650, an audio input-output circuit 660, and other input-output circuits 670. The components included in the processing device 600 may be interconnected via a bus or an internal connection.

In some embodiments, the transceiver 640 can include a wired transceiver or a wireless transceiver, such as a WIFI transceiver, a satellite transceiver, a Bluetooth transceiver, a wireless cellular phone transceiver, or a combination thereof. In some embodiments, the video input-output circuit 650 may include an image processing subsystem, such as a video camera, to perform a shooting function. The video camera can include a light sensor, for example, a charged coupled device (CCD) or a complementary metal-oxide semiconductor (CMOS). In some embodiments, the audio input-output circuit 660 may include a speaker, a microphone, a handset, and the like. In some embodiments, the other input-output devices 670 may include storage devices, USB ports, serial ports, parallel ports, printers, network interfaces, and the like.

In some embodiments, the processor 610 can perform the corresponding operations of the first processor or the second processor in the inter-core communication method described above, and detailed description thereof is omitted herein.

In some embodiments, the processing device 600 may be arranged at a mobile device. The mobile device can be movable in any suitable environment, for example, in the air (e.g., a fixed-wing aircraft, a rotorcraft, or an aircraft with neither a fixed-wing nor a rotor), in the water (e.g., a ship or a submarine), on land (e.g., car or train), space (e.g., space plane, satellite, or probe), and any combination of the above. The mobile device may include an aircraft, such as an unmanned aerial vehicle (UAV). In some embodiments, the mobile device can carry a living body, such as a person or an animal.

Figure 9:
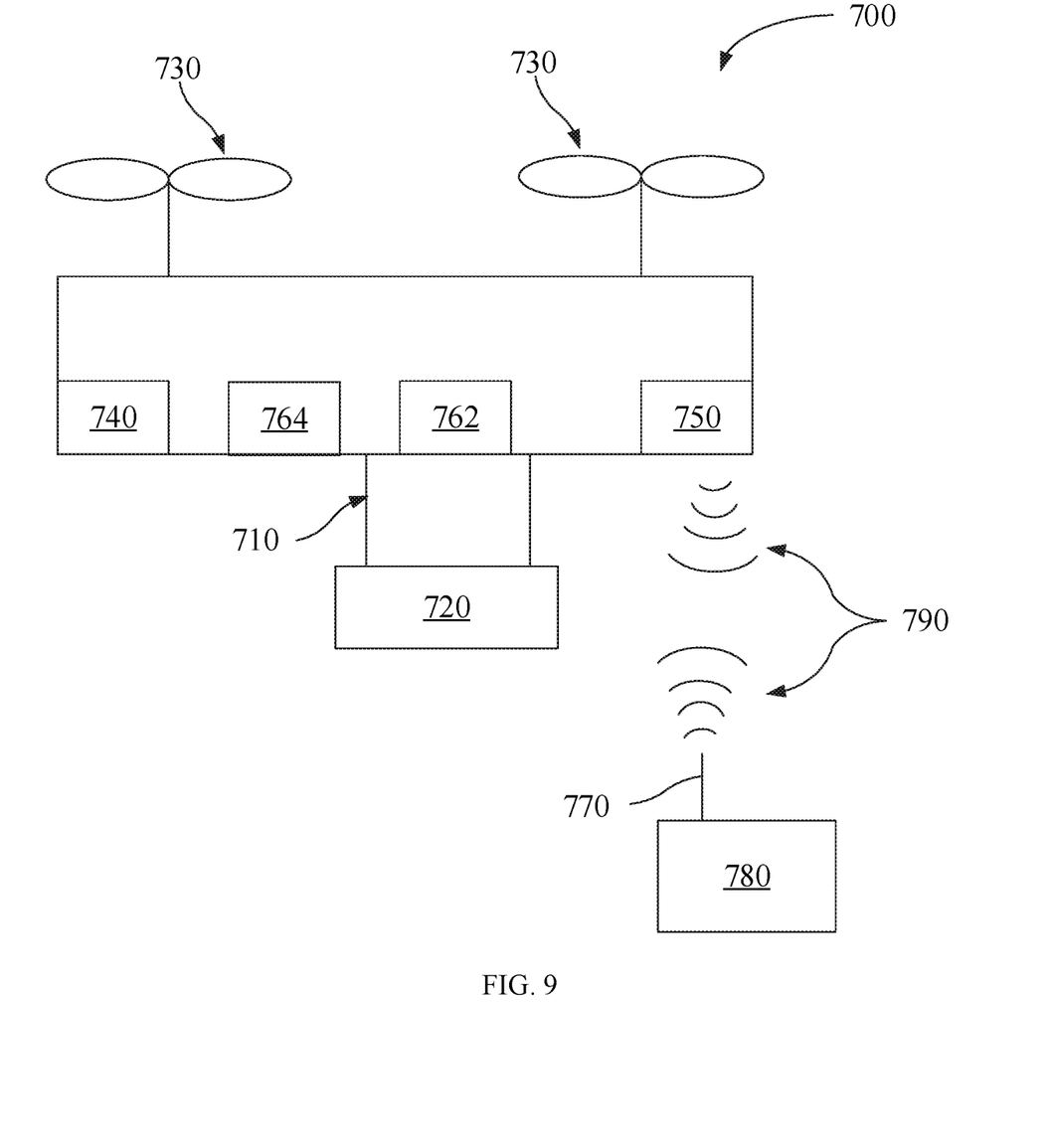
FIG. 9 is a schematic block diagram of a mobile device consistent with embodiments of the disclosure.

FIG. 9 is a schematic block diagram of an example mobile device 700 consistent with the disclosure. As shown in FIG. 9, the mobile device 700 includes a carrier 710 and a load 720. FIG. 9 takes a UAV as an example of the mobile device 700. The load 720 may not be connected to the mobile device through the carrier 710. The mobile device 700 may further include a power system 730, a sensing system 740, a communication system 750, a processing device 762, and a photographing system 764.

The power system 730 may include an electronic governor (also referred to as an ESC), one or more propellers, and one or more electric motors corresponding to the one or more propellers. The one or more motors and the one or more propellers can be arranged at corresponding arms. The electronic governor can be configured to receive a driving signal generated by a flight controller and provide a driving current to the one or more motors according to the driving signal, thereby controlling speeds and/or rotations of the one or more motors. The one or more motors can be configured to drive the one or more propellers to rotate, so as to provide a power for a UAV flight. The power can enable the UAV to achieve one or more degrees of freedom. In some embodiments, the UAV can be rotated about one or more rotation axes. For example, the rotation axes may include a roll axis, a tilt axis, and a pitch axis. The one or more motors can include direct current (DC) motors or alternating current (AC) motors. In addition, the one or more motors may include brushless motors or brushed motors.

The sensing system 740 can be configured to measure attitude information of the UAV, i.e., position information and status information of the UAV in space, for example, a three-dimensional position, three-dimensional angle, three-dimensional velocity, three-dimensional acceleration, three-dimensional angular velocity, and the like. The sensing system 740 may include at least one of a gyroscope, an electronic compass, an Inertial Measurement Unit (IMU), a visual sensor, a Global Positioning System ("GPS"), a barometer, or the like. The flight controller can be configured to control the UAV flight. For example, the UAV flight can be controlled according to the attitude information measured by the sensing system. The flight controller can control the UAV according to pre-programmed program instructions, or can control the UAV by responding to one or more control instructions from a control device.

The communication system 750 can communicate with a terminal device 780 having a communication system 770 through a wireless signal 590. The communication system 750 and the communication system 770 may include a plurality of transmitters, receivers, and/or transceivers for wireless communication. The wireless communication may be a one-way communication, for example, only the mobile device 700 can send data to the terminal device 780. The wireless communication may be two-way communication, and data may be sent from the mobile device 700 to the terminal device 780, or from the terminal device 780 to the mobile device 700.

In some embodiments, the terminal device 780 can provide control data for one or more mobile device 700, one or more carriers 710, and one or more loads 720, and can receive information sent by the one or more mobile devices 700, the one or more carriers 710, and the one or more loads 720. The control data provided by the terminal device 780 can be used to control status of the one or more mobile devices 700, status of the one or more carriers 710, and status of the one or more loads 720. In some embodiments, the carrier 710 and the load 720 can include a communication circuit configured to communicate with the terminal device 780.

The processing device 762 of the mobile device 700 in FIG. 9 can perform the corresponding operations of the first processor or the second processor in the inter-core communication method described above, and detailed description thereof is omitted herein.

It is intended that the embodiments disclosed herein are merely for illustrating and not to limit the scope of the disclosure. Changes, modifications, alterations, and variations of the above-described embodiments may be made by those skilled in the art without departing from the scope of the disclosure. The scope of the invention can be defined by the following claims or equivalent thereof.

What is claimed is:

1. An inter-core communication method comprising:
   receiving, by a first inter-core processing circuit of a first processor, an inter-core message sent by a first core of the first processor, the inter-core message indicating a target core;
   determining, by the first inter-core processing circuit according to the inter-core message, that the target core is a second core of a second processor;
   sending, by the first inter-core processing circuit, the inter-core message to a first cross-processor communication agent circuit of the first processor;
   sending, by the first cross-processor communication agent circuit, the inter-core message to a second cross-processor communication agent circuit of the second processor;
   sending, by the second cross-processor communication agent circuit, the inter-core message to a second inter-core processing circuit of the second processor; and
   sending, by the second inter-core processing circuit, the inter-core message to the second core; wherein:
   the first cross-processor communication agent circuit is arranged at the first core;
   the second cross-processor communication agent circuit is arranged at the second core;
   the first inter-core processing circuit is arranged at the first core; and
   the second inter-core processing circuit is arranged at the second core.

2. The method of claim 1, wherein determining that the target core is the second core of the second processor includes searching, by the first inter-core processing circuit, routing table entries according to the target core indicated by the inter-core message to determine that the target core is the second core of the second processor.

3. The method of claim 1, further comprising, before sending the inter-core message to the second cross-processor communication agent circuit:
   creating, by the first cross-processor communication agent circuit, a session between the first processor and the second processor.

4. The method of claim 1, wherein sending the inter-core message to the second cross-processor communication agent circuit includes sending, by the first cross-processor communication agent circuit, the inter-core message to the second cross-processor communication agent circuit using at least one of a Peripheral Component Interconnect Express (PCIE) bus, a rapid input output (IO) bus, a universal serial bus (USB), or a network.

5. The method of claim 1, wherein the inter-core message includes a data processing mode.

6. The method of claim 1, wherein the inter-core message includes data.

7. The method of claim 1,
   wherein the inter-core message includes an address of data in a storage space;
   the method further comprising:
   writing, by the first cross-processor communication agent circuit, the data into the storage space; and
   mapping, by the second cross-processor communication agent circuit, the second core to the address of the data in the storage space.

8. The method of claim 1, further comprising:
   sending, by the first cross-processor communication agent circuit, an interrupt message to the second processor; and
   receiving, by the second cross-processor communication agent circuit, the interrupt message from the first processor and triggering an interrupt of the second core according to the interrupt message.

9. The method of claim 1, further comprising:
   updating, by the first cross-processor communication agent circuit, state information of the inter-core message in a storage space;
   reading, by the second cross-processor communication agent circuit, the state information of the inter-core message in the storage space; and determining, by the second cross-processor communication agent circuit, whether the inter-core message has been updated according to the state information in the storage space.

10. A multi-processor communication system comprising:
a first processor including:
 a first inter-core processing circuit; and
 a first cross-processor communication agent circuit; and
a second processor including:
 a second inter-core processing circuit; and
 a second cross-processor communication agent circuit,
wherein:
 the first inter-core processing circuit is configured to:
  receive an inter-core message sent by a first core of the first processor, the inter-core message indicating a target core;
  determine, according to the inter-core message, that the target core is a second core of the second processor; and
  send the inter-core message to the first cross-processor communication agent circuit; and
 the first cross-processor communication agent circuit is configured to send the inter-core message to the second cross-processor communication agent circuit;
 the second cross-processor communication agent circuit is configured to send the inter-core message to the second inter-core processing circuit; and
 the second inter-core processing circuit is configured to send the inter-core message to the second core;
 wherein:
 the first cross-processor communication agent circuit is arranged at the first core;
 the second cross-processor communication agent circuit is arranged at the second core;
 the first inter-core processing circuit is arranged at the first core; and/or
 the second inter-core processing circuit is arranged at the second core.

11. The system of claim 10, wherein the first inter-core processing circuit is further configured to search routing table entries according to the target core indicated by the inter-core message to determine that the target core is the second core of the second processor.

12. The system of claim 10, wherein the first cross-processor communication agent circuit is further configured to create a session between the first processor and the second processor.

13. The system of claim 10, wherein the first cross-processor communication agent circuit is further configured to send the inter-core message to the second cross-processor communication agent circuit using at least one of a Peripheral Component Interconnect Express (PCIE) bus, a rapid input output (IO) bus, a universal serial bus (USB), or a network.

14. The system of claim 10, wherein the inter-core message includes a data processing mode.

15. The system of claim 10, wherein the inter-core message includes data.

16. The system of claim 10, wherein:
the inter-core message includes an address of data in a storage space;
the first cross-processor communication agent circuit is further configured to write the data into the storage space; and
the second cross-processor communication agent circuit is further configured to map the second core to the address of the data in the storage space.

17. The system of claim 10, wherein:
the first cross-processor communication agent circuit is further configured to send an interrupt message to the second processor; and
the second cross-processor communication agent circuit is further configured to receive the interrupt message from the first processor and trigger an interrupt of the second core according to the interrupt message.

18. The system of claim 10, wherein:
the first cross-processor communication agent circuit is further configured to update state information of the inter-core message in a storage space;
the second cross-processor communication agent circuit is further configured to:
 read the state information of the inter-core message in the storage space; and
 determine whether the inter-core message has been updated according to the state information in the storage space.

* * * * *